Jan. 19, 1960     F. W. PARRISH ET AL     2,922,091
CARTRIDGE ASSEMBLY FOR RECTIFIER
Filed Oct. 19, 1956     2 Sheets-Sheet 1
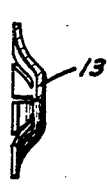
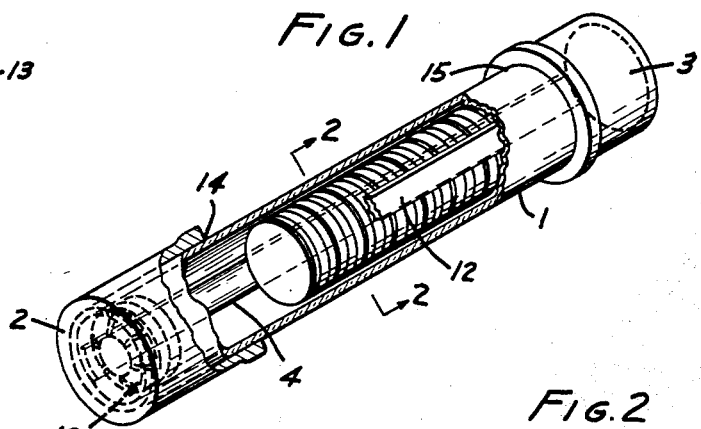
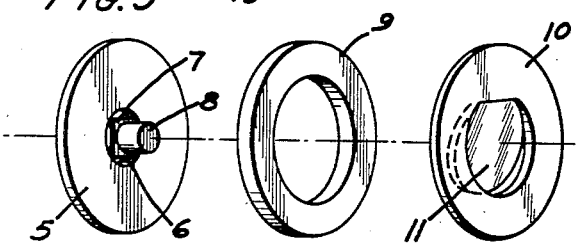
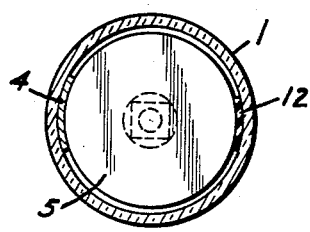
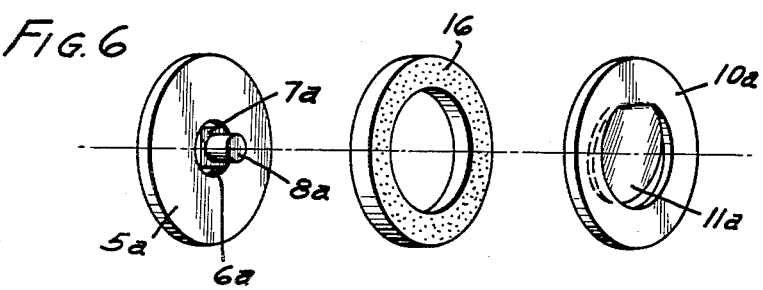
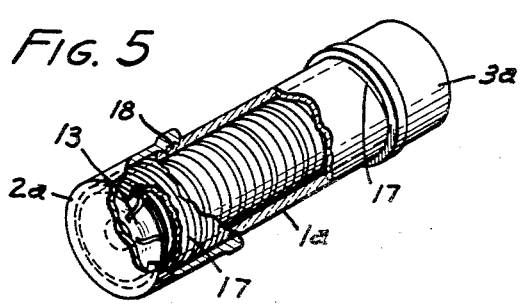
INVENTORS:
FRANK W. PARRISH
JACK EISLER
BY D. Gordon Angus
ATTORNEY.

Jan. 19, 1960

F. W. PARRISH ET AL 2,922,091

CARTRIDGE ASSEMBLY FOR RECTIFIER

Filed Oct. 19, 1956

INVENTOR.
FRANK W. PARRISH
BY
*D. Gordon Angus*
ATTORNEY.

United States Patent Office 2,922,091
Patented Jan. 19, 1960

2,922,091
CARTRIDGE ASSEMBLY FOR RECTIFIER

Frank W. Parrish, Lakewood, and Jack Eisler, Los Angeles, Calif., assignors to International Rectifier Corporation, El Segundo, Calif., a corporation of California Application October 19, 1956, Serial No. 617,126

9 Claims. (Cl. 317—234)

This invention relates to rectifier assemblies, and more particularly to such assemblies containing rectifier cells of the crystal junction or metallic or dry plate type.

An object of the invention is to provide an arrangement tending to equalize the reverse voltage across the individual rectifier elements of such an assembly.

The current-voltage characteristic of a typical crystal junction or dry plate or metallic type rectifier cell is such that it passes a relatively large current in the forward direction with relatively small voltage across the cell, and that it offers a relatively high resistance to reverse current flow so that there is relatively high reverse voltage across the cell. When a plurality of such cells are connected in series the same current is flowing through the cells both in the forward direction and in the reverse direction. The reverse resistivity of different cells may be somewhat different from each other with the result that a cell of higher reverse resistance than other cells in the series group will have proportionately more voltage across it than the other cells. It is well known that the higher the reverse voltage across a cell the more danger there is of it breaking down. For this reason it is desired to limit the amount of reverse voltage which can develop across individual cells.

In accordance with the present invention, there is provided a leakage path for current flow in parallel with the individual cells or units of the series arrangement. This leakage path constitutes in effect a voltage divider. By making the resistance of this leakage path or voltage divider arrangement across all the cells equal in magnitude, the tendency will be to make the reverse voltage across all the cells equal; and this equality of voltage will be approached when the magnitude of current flowing through the leakage path or voltage divider is substantial in relation to the reverse current flowing through the rectifier.

Features of our invention reside in particular arrangements for assembling and mounting the individual rectifier units or cells in relation to the voltage divider arrangement.

The foregoing and other features of our invention will be better understood from the following detailed description and the accompanying drawings of which:

Fig. 1 is an isometric view partially in cross section showing an assembly in accordance with this invention;

Fig. 2 is a cross-section view taken at line 2—2 of Fig. 1;

Fig. 3 shows an exploded arrangement of a group comprising a rectifier unit, an insulator and a contact spring used in the assembly of Fig. 1;

Fig. 4 shows an end spring used in the assembly of Fig. 1 and Fig. 5;

Fig. 5 is an isometric view partly in cross section of another form of assembly in accordance with this invention;

Fig. 6 shows in exploded form a group comprising a rectifier, a resistor and a contact spring used in the assembly of Fig. 5;

Figure 7:
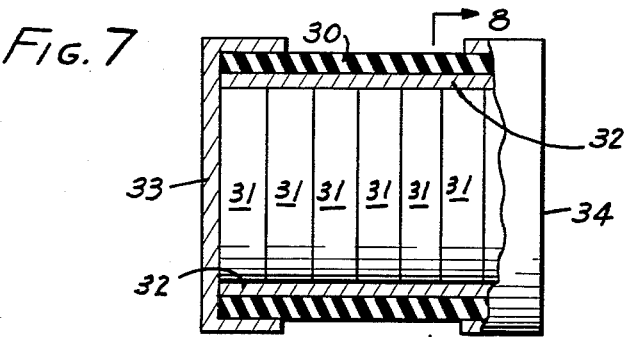
Fig. 7 is a fragmentary cross-section of another embodiment according to the invention.

Fig. 1 shows a rectifier cartridge comprising a hollow cylinder or envelope 1 of electrical insulating material such as glass or ceramic having conductive ferrules 2 and 3 acting as caps or closures for the respective ends. Ferrules 2 and 3 have an internal diameter slightly larger than the external diameter of the hollow cylinder 1 permitting them to fit over the respective ends of the cylinder 1. The external diameter of ferrules 2 and 3 is of a size for convenient insertion into spring contacts of an electric circuit and each ferrule has a flange at its open end to prevent the rectifier cartridge from sliding lengthwise when gripped by such spring contacts. The hollow cylinder 1 may be attached and sealed to ferrules 2 and 3 by metalizing the outer cylinder surface near the cylinder ends and soldering around the circumference of the cylinder at 14 and 15 where the edge of a ferrule at its open end meets the cylinder. Within the cylinder and in contact with the inner wall thereof there is provided a conductive resistor strip 4 extending from one ferrule terminal to the other and in electrical contact therewith. The strip should have a substantial electrical resistance which is uniform throughout its length. For a rectifier cell operated at 300 volts peak voltage per cell and with a resistance to reverse leakage current of 25,000 ohms, it has been found desirable to use a strip resistor having a resistance of approximately 18,000 ohms bridging each rectifying cell. A suitable material for such a resistor is well known in the art and generally comprises an insulating material such as hard rubber, which is coated with a high resistance composition such as carbon, or any of the compositions of the type commonly used in printed circuits.

The cylinder is loaded with a plurality of rectifier cells or units of the crystal junction type such as germanium or silicon junction, arranged in series with each other. One of these rectifier units or cells is shown in exploded form in Fig. 3. Referring to Fig. 3 there is shown a base plate or disc 5 which may for example be of steel or aluminum provided with a centrally located indentation 6 within which there is placed a wafer 7 of an active rectifying material which may for example be a semi-conductor such as germanium or silicon welded or soldered in place within the recess. To the outer surface of the wafer there is welded or soldered an electrode 8 according to a well known practice. It will be recognized that this element comprising the disc, wafer and anode constitutes a rectifier.

A spacer member 9 (sometimes called a "spacer washer") in the shape of an annular washer is made of an insulating material. It has a central hole for receiving electrode 8. It is placed between and in contact with a spring washer 10 and a base plate 5. Spring washer 10 is formed from a disc of conductive metal such as brass, and has a tongue 11 punched in it to form a spring leaf to contact the anode.

In assembling the rectifier unit of Fig. 3, the insulator member 9 is placed in contact with the side of the rectifier base plate on which is located the anode; and over the insulator member there is placed the spring washer 10 so that the spring leaf 11 presses against the anode. The outer diameter of the three members 5, 9 and 10 are of substantially the same dimension, but care should be taken that the diameter of the base plate discs or spring contact discs are at least as great or perhaps a trifle greater than that of the insulator rings. Furthermore, all of the discs will be of slightly less diameter than the diameter of the cylinder 1 to allow for the space occupied by the resistor strip 4 and also for a resilient strip 12 mentioned hereinbelow.

A number of rectifier cells comprising elements 5, 9 and 10 are placed within the cartridge seriatim so as to be in contact with each other and substantially to fill the cartridge. At each end of the stack of rectifier cells there is placed a spring contact member 13 of which one is shown in Fig. 4, which will be in contact with the end rectifier member and with the respective ferrule terminal. Thus, at one end of the stack a spring contact member 13 will be located between the last spring washer contactor 10 and the ferrule; while at the other end a spring contact member 13 will be located between the back of a base plate 5 and its respective ferrule terminal. The entire stack will be in compression as a result of the aggregate of the pressures on all the spring washer members and spring contact members in the stack.

For the purpose of insuring that the edges of the several base plates of the rectifier cells will be in good electrical contact with the resistor strip 4 there is provided along the inner surface of the cylinder 1 between the cylinder and the stack members, a strip 12 of resilient material such as silicone rubber or the like which is resilient at high temperatures. This is located diametrically opposite the resistor strip 4 so that the resiliency of the resilient strip will continually urge the rectifier discs into contact with the resistor strip.

Fig. 5 shows a second embodiment of the invention which also provides resistances in parallel with each rectifier cell. The hollow envelope 1a of Fig. 5 will have a smaller internal diameter than the hollow cylinder 1 of Fig. 1 if the rectifier elements are to have the same diameter as the elements used in Fig. 1 because neither the conductive strip resistor 4 nor the resilient strip 12 is used. Fig. 5 also shows the alternate use of a plastic envelope 1a with threads 17 on each end of the cylinder on its outside surface. Internal threads 18 are given to each ferrule 2a and 3a. Threads 17 and 18 mate.

The detail of the parts shown assembled in Fig. 5 is best shown in Fig. 6. The numbered parts of Fig. 6 correspond with respective parts of Fig. 3, for example, 5a and 5 or 10a and 10. A difference of Fig. 6 from Fig. 3 is in the element separating a cathode base plate or disc 5a and a spring washer contact 10a. The element between a base plate 5a and a spring washer contact 10a in Fig. 6 is an annular resistor member 16 which is substituted for the annular insulator member 9 of Fig. 3. In Fig. 6 the annular resistor member 16 is shaped and dimensioned somewhat similar to an annular insulator member 9 of Fig. 3 so that it may fit in an assembly of a rectifier element, an annular resistor member 16, and a spring contact washer 10a in the same manner that elements 5, 9 and 10 of Fig. 3 are assembled. The annular resistor member 16 of Fig. 6 is, however, of a high resistance material such as compressed carbon, for example.

Figure 8:
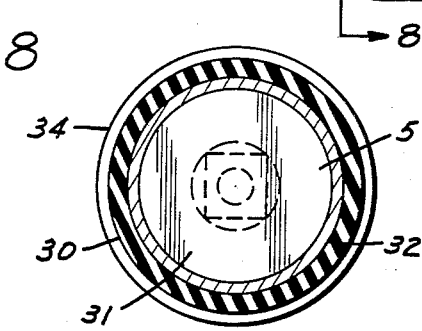
Fig. 8 is a cross-section taken at line 8—8 of Fig. 7.

Figs. 7 and 8 illustrate an embodiment wherein a hollow, non-flexible tubular envelope 30 is made of an insulating material that contains a stack of rectifier elements schematically illustrated by numerals 31. Each element 31 within the envelope may conveniently comprise an assembly of parts numbered 5, 9 and 10 in Fig. 3. A deposit 32 of resistance material is deposited on the inside surface of the envelope. The deposit has a substantial electrical resistance which is uniform along its length in the envelope. It extends along the interior wall of the envelope from one conductive terminal 33 to the other conductive terminal 34, and is in electrical contact therewith, and also in electrical contact with all of the base plates 5.

Figure 9:
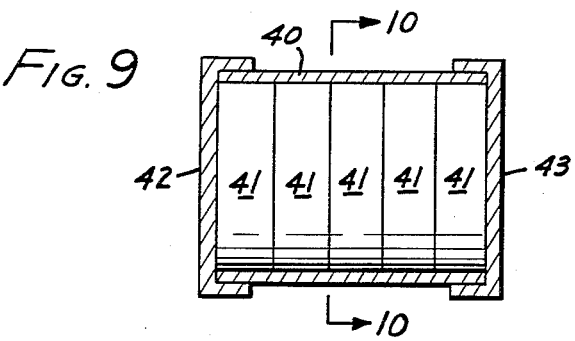
Fig. 9 is a fragmentary cross-section of still another embodiment according to the invention.
Figure 10:
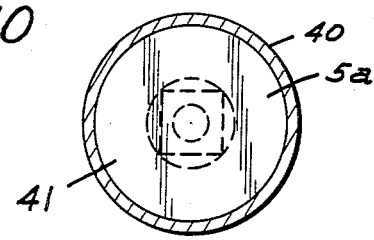
Fig. 10 is a cross-section taken at line 10—10 of Fig. 9.

Figs. 9 and 10 show still another embodiment, in which a hollow, non-flexible envelope 40 of resistance material contains a stack of rectifier elements 41. Rectifier elements 41 are shown schematically, each may conveniently comprise an assembly of parts numbered 5, 9 and 10 in Fig. 3. The envelope has a substantial and uniform resistance along its length and is in electrical contact with each of the base plates 5. A conductive terminal 42 closes one end of the tube, and conductive terminal 43 closes the other end. Each terminal is in electrical contact with one end of the stack of rectifier elements, and each is also in electrical contact with the envelope.

In the embodiment of Fig. 1 it is apparent that the conductive strip resistor 4 of uniform resistance along its length, which is in contact with each conductive ferrule cap, acts as a voltage divider which will divide the reverse voltage between ferrule caps substantially equally across the respective cells of the series by means of equal physical spacing of cells. This will follow from the fact that the several cells are similar in shape and size; so that their contact with the resistor strip 4 thus places equal increments of resistance of the strip in parallel with the respective cells of the series. The embodiment provides for firm contact between each base plate member and the conductive strip resistor by means of a resilient strip opposite the conductive strip.

The annular resistor members 16 of the embodiment of Fig. 5 also acts as a voltage divider for the cells in the series arrangement. This results from equal resistance being placed in parallel with each cell by means of the respective annular resistor members 16 of similar shape, size, and material composition. Each resistor member 16 forms a link in a circuit between base plates of adjacent cells by making contact between a base plate and a contact washer which is in turn in contact with another base plate. The cathode base plate of one end cell electrically in contact with one ferrule and a side of an end annular resistor member in contact with an end spring washer which is electrically in contact with the other ferrule completes the resistor path between the ferrules. Firm contact between cathode base plates and annular resistor members is maintained by the spring contact member 13 on each end which also holds the series cells in good contact with one another.

It will be seen that all of the embodiments illustrated and described provide equal resistance leakage paths for current flow in parallel with individual cells or units of the series arrangement. The equal resistance paths provided across each cell acts as a voltage divider by tending to divide the total reverse voltage between ferrule caps equally among the cells in series when current through the equal shunt resistances is substantial in relation to reverse current flowing through rectifiers of the series.

Although it will ordinarily be desired that the reverse voltage be divided equally among the cells as described above, it will be recognized that the reverse voltage could be divided unequally, if desired for special circumstances, by placing unequal increments of resistance across different ones of the series-arranged cells.

Although the particular embodiments of the invention described herein utilize the crystal-junction type rectifier cells, it will be understood that other types of dry rectifiers could be used such as selenium or the copper oxide type or the like. These last-mentioned type dry rectifiers are commonly called dry-plate rectifiers; and they comprise a base plate similar to the base plates in the embodiments described and illustrated hereinabove. The electrodes opposite the base plates of such dry-plate rectifier are more commonly called counterelectrodes.

As used in the appended claims, however, the term "electrode" is used to cover all such electrodes opposite the base plate electrode, whether it be the anode or cathode of a crystal-junction type rectifier cell or the counterelectrode of a dry-plate type rectifier cell.

This invention is not to be limited to the embodiments shown in the drawings and described in the description, which are given by way of example and not of limitation, but only in accordance with the scope of the appended claims.

We claim:

1. A rectifier assembly comprising a hollow envelope of insulating material, a conductive cap closing each end of the envelope and constituting a terminal of the assembly, a plurality of rectifier elements each having two terminals one of which is a base plate, stacked in series relation with each other within the envelope, a conductive washer of high resistance located between and in electrical contact with adjacent base plates, the ends of the stack being in electrical contact with the respective caps.

2. A crystal junction type rectifier assembly comprising: a plurality of rectifier elements, similar in shape, size and electrical characteristics, connected electrically in a series stack; each rectifier element comprising a spring washer, a protruding spring leaf on said spring washer, a conductive spacer washer having a hole therethrough, which spacer washer is in contact with said spring leaf contact washer, an electrode within said hole and in contact with said spring washer, a wafer of rectifying material in contact with said electrode, a base plate in contact with said wafer and said base plate also in contact with a contact washer of an adjacent rectifier element; a hollow non-flexible insulating envelope having two openings, the stack of rectifier elements being disposed inside said envelope; a pair of conductive caps, each of which is attached to said hollow envelope and closes one of the holes in said hollow envelope; and a pair of conductive spring contact members, one of which is located on each end of the series stack of rectifier elements in contact with an end rectifier element and in contact with one of said conductive caps, thereby holding the series of rectifier elements in firm conductive connection.

3. A crystal junction type rectifier assembly comprising: a plurality of rectifier elements, similar in shape and size and electrical characteristics, connected electrically in a series stack; each rectifier element comprising a spring washer, a protruding spring leaf on said contact washer, a conductive spacer washer having a hole therethrough, which spacer washer is in contact with said spring washer, an electrode in contact with said spring leaf, a wafer of rectifying material in contact with said electrode, a base plate in contact with said wafer and said base plate also in contact with a spring washer of an adjacent rectifier element; a hollow non-flexible insulating envelope having two openings, the stack of rectifier elements being disposed inside said envelope; a pair of conductive caps, each of which is attached to said hollow envelope and closes one of the holes in said hollow envelope, a pair of conductive spring contact members, one of which is located on each end of the series stack of rectifier elements in contact with an end rectifier element and in contact with one of said conductive caps, thereby holding the stack of rectifier elements in firm conductive connection.

4. A crystal junction type rectifier assembly according to claim 3 wherein the hollow envelope is tubular in shape, the base plates are disc shaped, the spacer washers are substantially annular in shape, and the spring washers are of a flat circular shape with a protruding circular portion at its center partially punched out and attached along a portion of the circumference of said centrally located circular portion to form the spring leaf.

5. A crystal junction type rectifier assembly comprising: a plurality of rectifier elements, similar in shape and size and electrical characteristics, connected electrically in a series stack; each rectifier element comprising a spring washer, a protruding spring leaf on said contact washer, a spacer washer of insulating material having a hole therethrough, which said spacer washer is in contact with said leaf contact an electrode in contact with said spring leaf, a wafer of rectifying material in contact with said electrode, a base plate in contact with said wafer, and said base plate being in contact with a spring washer of an adjacent rectifier element, a hollow non-flexible insulating envelope having two openings, the stack of rectifier elements being disposed inside said envelope; a pair of conductive caps, each of which is attached to said hollow envelope and closes one of the holes in said hollow envelope; a pair of conductive spring contact members, one of which is located on each end of the series stack of rectifier elements in contact with an end rectifier element and in contact with one of said conductive caps, thereby holding the series of rectifier units in firm conductive connection; a single uniform long semi-flexible conductive resistor in contact with the edges of all cathode base plates of the stack of series elements and said conductive resistor also being in contact with the inside of the two conductive caps which enclose the holes in said hollow envelope; a strip of elastic insulating material under compression between the envelope and all base plates of the series units, said strip of elastic material being located substantially diametrically opposite a line of contact points of base plate edges and said resistor, thereby insuring contact between said base plates and said resistor.

6. A crystal junction type rectifier assembly comprising: a plurality of rectifier elements, similar in shape and size and electrical characteristics, connected electrically in a series stack; each rectifier element comprising a spring washer, a protruding leaf on said contact washer, a spacer washer of insulating material having a hole therethrough, which spacer washer is in contact with said spring washer, an electrode in contact with said spring leaf, a wafer of rectifying material in contact with said electrode, a base plate in contact with said wafer and said base plate also being in contact with a spring washer of an adjacent rectifier element; a hollow non-flexible insulating envelope having two openings, the stack of rectifier elements being disposed inside said envelopes; a pair of conductive caps, each of which is attached to said hollow envelope and closes one of the openings in said hollow envelope; a pair of conductive spring contact members, one of which is located on each end of the series stack of rectifier elements in contact with an end rectifier element and in contact with one of said conductive caps, thereby holding the series of rectifier units in firm conductive connection; a uniform long semi-flexible conductive resistor strip in contact with the edges of all base plates of the stack of series elements and said conductive resistor strip also being in contact with the inside of the two conductive caps which close the openings in said hollow envelope; a strip of resilient insulating material under compression between the envelope and all base plates of the series units, said strip of resilient material being located substantially diametrically opposite a line of contact points of base plate edges and said resistor strip, thereby insuring contact between said base plate and said strip resistor.

7. A crystal junction type recifier assembly according to claim 6 wherein the hollow envelope is tubular in shape, the base plates are disc shaped, the spring leaf contacts are of a flat circular shape with a protruding circular portion at its center partially punched out and attached along a portion of the circumference of said centrally located circular portion to form said spring leaf, and said spring washers have a smaller diameter than the diameter of said base plates, the spacer washers are substantially annular in shape and said spacer washers have a smaller diameter than the diameter of said base plates.

8. A rectifier assembly comprising a hollow envelope of insulating material, a conductive cap closing each end of the envelope, and constituting a terminal of the assembly; a plurality of rectifier elements each having two terminals one of which is a base plate, said elements being stacked in series relation with each other within the envelope, the ends of the stack being in electrical contact with the respective caps, a conductive strip of a material having a uniform electrical resistance along its length, extending along the interior wall of the envelope from one cap to the other and in electrical contact with both of said caps and with all of said base plates, and a strip of resilient material within the envelope and in contact with the wall thereof, the strip of resilient material extending substantially parallel to said conductive strip and being on the opposite side of the rectifier elements from said conductive strip, said resilient strip being in resilient engagement with said base plates, and compressed thereby, whereby said base plates are urged into close contact with said conductive strip.

9. A rectifier assembly comprising a hollow envelope of insulating material, a conductive cap closing each end of the envelope and constituting a terminal of the assembly; a plurality of rectifier elements each having two terminals, one of which is a base plate, and each rectifier element comprising in addition to its said base plate a semi-conductor metal mounted on its base plate, and an electrode on the semi-conductor metal, a spacer washer of insulating material having a central hole, the spacer washer being in contact with the base plate, and said electrode protruding into said hole, and a spring washer in contact with the side of the spacer washer opposite the base plate, the spring washer including a spring portion in contact with the electrode, said rectifier elements being stacked in series relation with each other within the envelope, the ends of the stack being in electrical contact with the respective caps, and a conductive strip of a material having a uniform electrical resistance along its length, extending along the interior wall of the envelope from one cap to the other and in electrical contact with both of said caps and with all of said base plates.

References Cited in the file of this patent

UNITED STATES PATENTS

| | | |
|---|---|---|
| 2,457,138 | Escoffery et al. | Dec. 28, 1948 |
| 2,498,666 | Escoffery et al. | Feb. 28, 1950 |
| 2,781,480 | Mueller | Feb. 12, 1957 |